(12) United States Patent
Wang

(10) Patent No.: US 10,469,485 B2
(45) Date of Patent: Nov. 5, 2019

(54) MULTI-FUNCTIONAL IDENTIFICATION RECOGNITION SYSTEM CAPABLE OF RECOGNIZING THE IDENTITY OF USERS

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 112 days.

(21) Appl. No.: 15/693,493

(22) Filed: Sep. 1, 2017

(65) Prior Publication Data

US 2019/0075101 A1    Mar. 7, 2019

(51) Int. Cl.
*H04L 29/06* (2006.01)
*G06F 21/31* (2013.01)
*G06F 16/951* (2019.01)
*G06F 21/32* (2013.01)

(52) U.S. Cl.
CPC ........ *H04L 63/0853* (2013.01); *G06F 16/951* (2019.01); *G06F 21/31* (2013.01); *H04L 63/083* (2013.01); *H04L 63/0861* (2013.01); *G06F 21/32* (2013.01); *H04L 63/102* (2013.01); *H04L 2463/082* (2013.01)

(58) Field of Classification Search
CPC ............... H04L 63/0853; H04L 63/083; H04L 63/0861; G06F 16/951
See application file for complete search history.

(56) References Cited

U.S. PATENT DOCUMENTS

| | | | |
|---|---|---|---|
| 8,401,875 B2 | 3/2013 | Fish | |
| 9,426,139 B1 | 8/2016 | McClintock | |
| 10,341,322 B1* | 7/2019 | Blinn | H04L 63/08 |
| 2009/0116703 A1 | 5/2009 | Schultz | |
| 2016/0219036 A1* | 7/2016 | Devkar | H04L 63/20 |
| 2018/0034859 A1* | 2/2018 | Aronowitz | H04L 63/205 |

FOREIGN PATENT DOCUMENTS

| | | |
|---|---|---|
| JP | 2002-229956 A | 8/2002 |
| JP | 2003-50783 A | 2/2003 |
| JP | 2003-256380 A | 9/2003 |
| JP | 2006-209697 A | 8/2006 |
| JP | 2007-334707 A | 12/2007 |
| JP | 2011-100268 A | 5/2011 |
| JP | 2013-534652 A | 9/2013 |

\* cited by examiner

*Primary Examiner* — Tri M Tran
(74) *Attorney, Agent, or Firm* — Winston Hsu

(57) ABSTRACT

A multi-functional identification recognition system includes a server storing a database, the database containing a plurality of user identities. For each user identity, the database stores a corresponding plurality of identification fields for uniquely identifying a user corresponding to the user identity. The multi-functional identification recognition system also includes a multi-functional identification reader being in communication with the server through an internet connection and having a plurality of identity recognizing devices. When the user registers with the server or verifies identification data already stored in the server, a plurality of identity recognizing devices read the user's identification data and send the identification data to the server through the internet connection, and each type of identification data is stored in or checked against one of the identification fields corresponding to the user.

10 Claims, 6 Drawing Sheets

MULTI-FUNCTIONAL IDENTIFICATION RECOGNITION SYSTEM CAPABLE OF RECOGNIZING THE IDENTITY OF USERS

BACKGROUND OF THE INVENTION

1. Field of the Invention

The invention relates to a multi-functional identification recognition system, and more particularly, to a multi-functional identification recognition system having a multi-functional identification reader with a plurality of identity recognizing devices for recognizing the identity of users.

2. Description of the Prior Art

In modern times there has been a great increase in the number of different access cards or accounts that people use for accessing various services. Examples include bank accounts accessible through either an automatic teller machine (ATM) or through online banking, accounts through various other websites, as well as door access cards that people use for entering buildings.

With the increased number of cards and accounts that people use to access these services, it becomes problematic for people to manage all of the cards, user names, personal identification numbers, and passwords necessary to gain access. Furthermore, if an unauthorized person manages to gain access to a user's service by illegally obtaining an access card and/or a password, the unauthorized person can cause great damage as a result of this unauthorized access. Although two-step or multi-step authentication is helpful for avoiding unauthorized access, this also creates more hassle for the user. Since there are usually multiple devices required for performing two-step or multi-step authentication, this causes inconvenience when the user has to switch from one device to another in order to perform verification.

SUMMARY OF THE INVENTION

According to an exemplary embodiment, a multi-functional identification recognition system is disclosed. The multi-functional identification recognition system includes a server storing a database, the database containing a plurality of user identities, wherein for each user identity, the database stores a corresponding plurality of identification fields for uniquely identifying a user corresponding to the user identity. The multi-functional identification recognition system also includes a multi-functional identification reader being in communication with the server through an internet connection and having a plurality of identity recognizing devices, wherein when the user registers with the server or verifies identification data already stored in the server, a plurality of identity recognizing devices read the user's identification data and send the identification data to the server through the internet connection, and each type of identification data is stored in or checked against one of the identification fields corresponding to the user.

According to another exemplary embodiment, a method of authenticating a user's identity using a multi-functional identification recognition system is disclosed. The method includes the user registering with a database stored in a server, the database containing a plurality of user identities, wherein for each user identity, the database stores a corresponding plurality of identification fields for uniquely identifying a user corresponding to the user identity; registering identification data for each user using a multi-functional identification reader being in communication with the server through an internet connection and having a plurality of identity recognizing devices, wherein when the user registers with the server, a plurality of identity recognizing devices read the user's identification data and send the identification data to the server through the internet connection, and each type of identification data is stored in one of the identification fields corresponding to the user; and verifying the user's identity by reading the user's identification data with the multi-functional identification reader, sending the read identification to the server, and comparing the read identification data with the identification data stored in the database.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
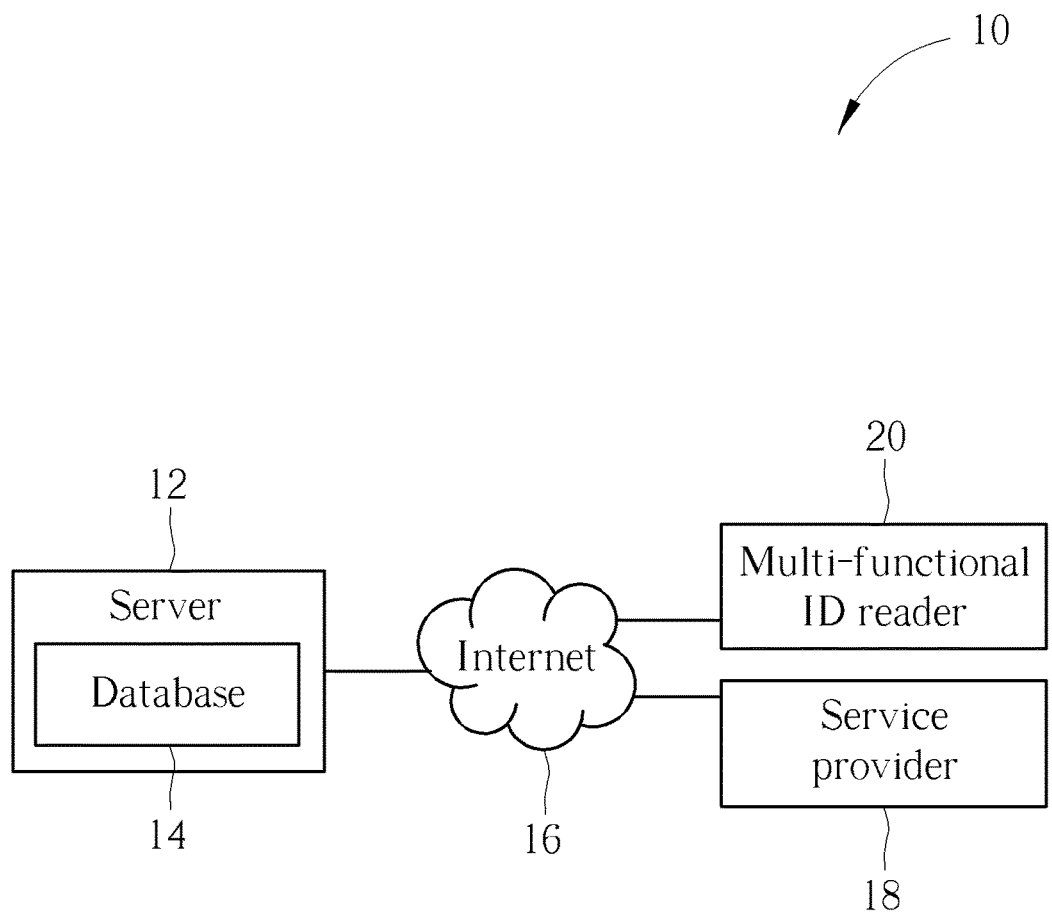
FIG. 1 is a functional block diagram of a multi-functional identification recognition system according to the present invention.

Please refer to FIG. 1. FIG. 1 is a functional block diagram of a multi-functional identification recognition system 10 according to the present invention. The multi-functional identification recognition system 10 contains a server 12 having a database 14 contained therein. The database 14 can also be located outside of the server 12, but in any case, the server 12 will still be able to read from and write to the database 14. A multi-functional identification reader 20 and a service provider 18 are each connected to the server 12 via the internet 16. The server 12, the multi-functional identification reader 20, and the service provider 18 can each be connected to the internet 16 through either a wireless or a wired connection. The service provider 18 can be any kind of service in which a user's identity needs to be verified before access is granted to the service provider 18. Examples of the service provider 18 include an ATM, an online banking account, other online accounts, access control doors in high security buildings or office buildings, and so on.

Figure 2:
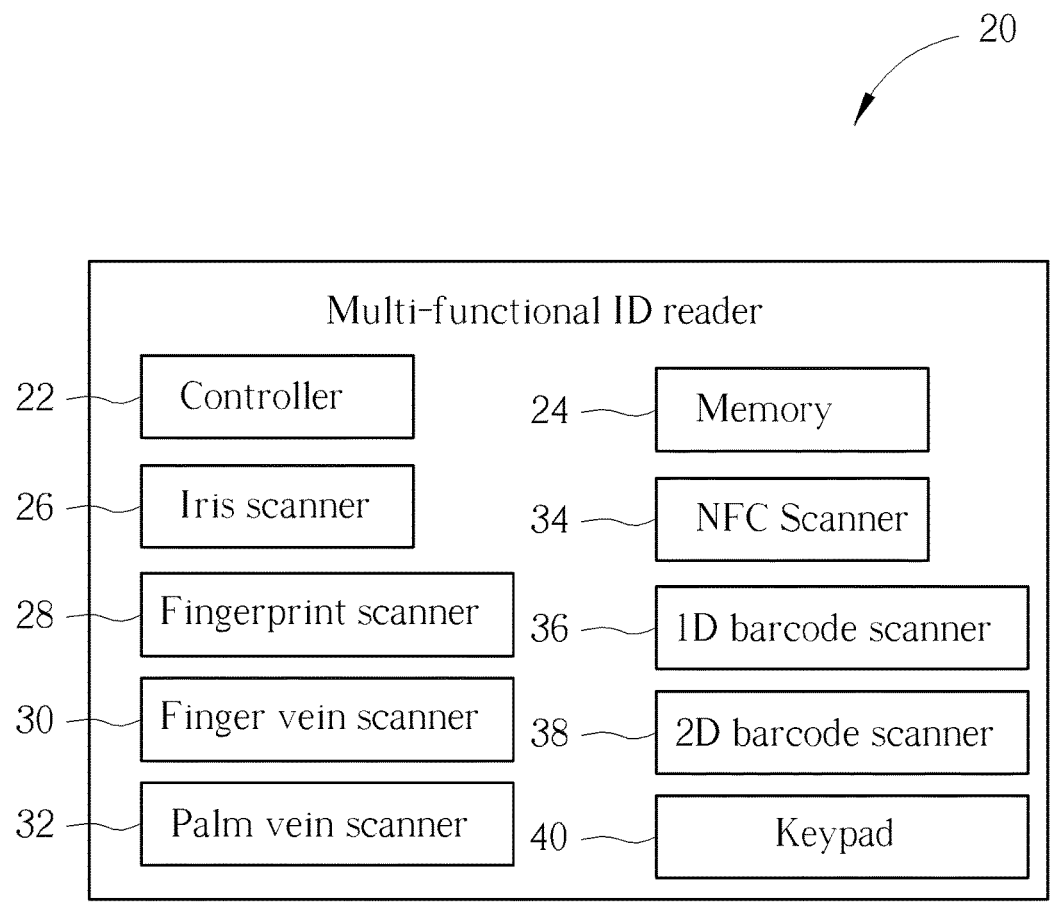
FIG. 2 is a functional block diagram of the multi-functional identification reader according to the present invention.

Please refer to FIG. 2. FIG. 2 is a functional block diagram of the multi-functional identification reader 20 according to the present invention. The multi-functional identification reader 20 contains a controller 22 such as a microprocessor or a central processing unit for controlling the operation of the multi-functional identification reader 20 and for executing software code stored in a memory 24. The memory 24 is preferably a non-volatile memory for storing the software code in a non-volatile manner, and the memory 24 may also include random access memory (RAM) for temporarily storing software code or data that is being operated on by the controller 22.

The multi-functional identification reader 20 contains a plurality of identity recognizing devices for reading different forms of the user's identification data. The multi-functional identification reader 20 may contain any number of identity recognizing devices, and the following are provided for reference only. The present invention preferably contains two or more identity recognizing devices, but there is no upper limit as to how many identity recognizing devices the multi-functional identification reader 20 may contain. To start with, the multi-functional identification reader 20 may contain an iris scanner 26 for scanning the user's eyes. A retina scanner can be used instead of or in addition to the iris scanner 26, as is well known to a person having ordinary skill in the art. In either case, an ocular scan of one or preferably both of the user's eyes is produced and stored in the database 14.

The multi-functional identification reader 20 may contain a fingerprint scanner 28 for scanning any or all of the user's fingerprints. Instead of scanning only a single fingerprint or a few fingerprints of the user, all of the user's fingerprints may be scanned and stored in the database 14. In a similar manner the multi-functional identification reader 20 may contain a finger vein scanner 30 and/or a palm vein scanner 32. The finger vein scanner 30 scans the user's finger or fingers and creates images of human finger vein patterns beneath the skin's surface for each finger. The palm vein scanner 32 similarly creates images of vein patterns beneath the skin's surface for each of the user's palms. The finger vein scanner 30 can scan one or all of the user's fingers and store the resulting images in the database 14, and the palm vein scanner 32 can similarly scan one or both of the user's palms and store the resulting images in the database 14.

A near field communication (NFC) scanner 34 can be used to scan a user's physical identification device such as a contactless smartcard or any other device that makes use of NFC technology. The user may store code values in the database 14 for one NFC-compatible object or multiple-NFC compatible objects, and there is no limit as to how many NFC code values can be stored in the database 14.

The multi-functional identification reader 20 may include a one-dimensional barcode scanner 36 or a two-dimensional barcode scanner 38 for scanning one or more barcodes that are located on objects in the user's possession. The two-dimensional barcodes may be any type of matrix barcode such as a Quick Response Code (QR code). A keypad 40 may also be installed on the multi-functional identification reader 20 for allowing the user to enter a personal identification number (PIN) or a password. This PIN or password is stored in the database 14, and can be used to verify the user's identity as is well known in the art.

Figure 3:
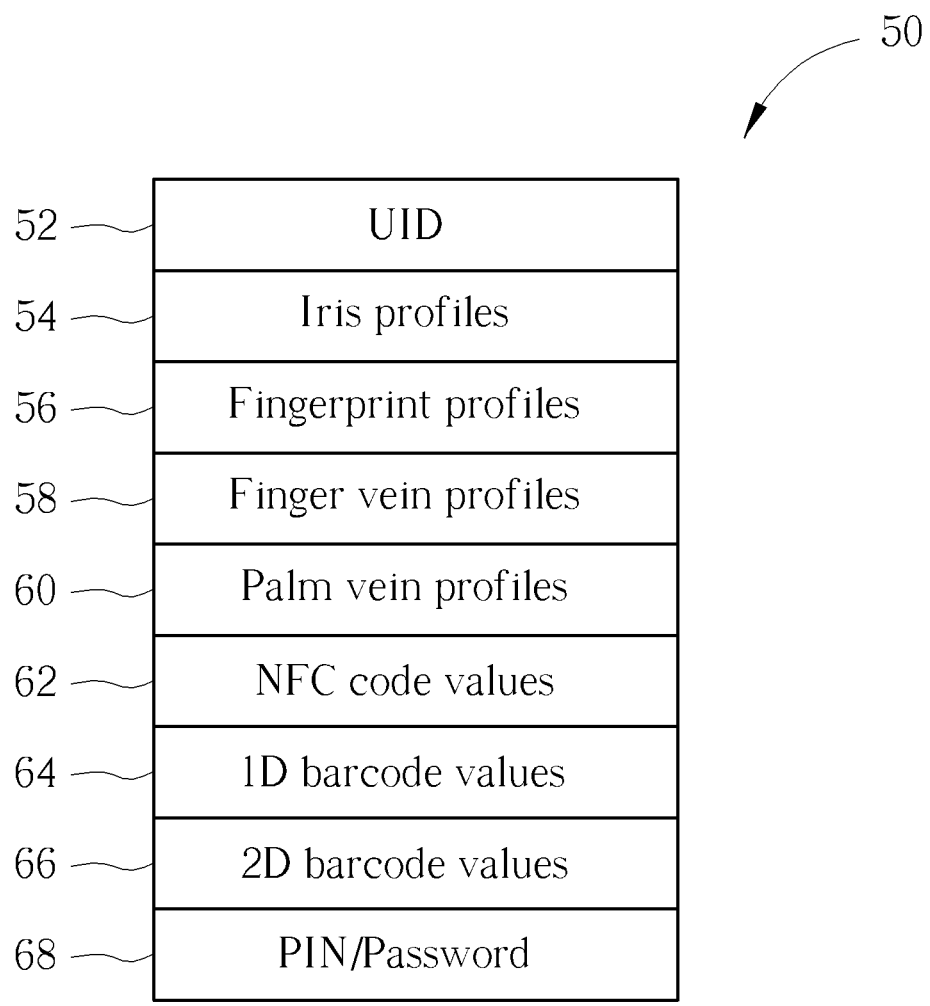
FIG. 3 is a user profile showing an example of an entry in the database for a user identity.

Please refer to FIG. 3. FIG. 3 is a user profile 50 showing an example of an entry in the database 14 for a user identity (UID) 52. For each UID 52, a corresponding plurality of identification fields are stored in the database 14 for uniquely identifying the user that corresponds to the UID 52. In this example, the user profile 50 contains the following identification fields that correspond to the UID 52. Iris profiles 54 store one or more iris images of the user. As stated above, retina images could also be stored instead of or in addition to the iris images. Fingerprint profiles 56 may store images related to any or all of the user's fingerprints. Finger vein profiles 58 and palm vein profiles 60 can also be stored in a similar manner. One or more NFC code values 62 corresponding to the UID 52 may also be stored in the user profile 50. That is, the user may wish to store NFC codes for multiple smart cards or other NFC-compatible objects instead of storing only a single NFC code. One-dimensional barcode values 64 and two-dimensional barcode values 66 may be stored in the user profile 50, with one or more of each type capable of being stored. PIN or password values 68 can also be stored in the user profile 50, and again either one or more than one PIN or password can be stored. The user is able to customize exactly which of the above identification fields to use, and how much data to store in each of the different identification fields.

Figure 4:
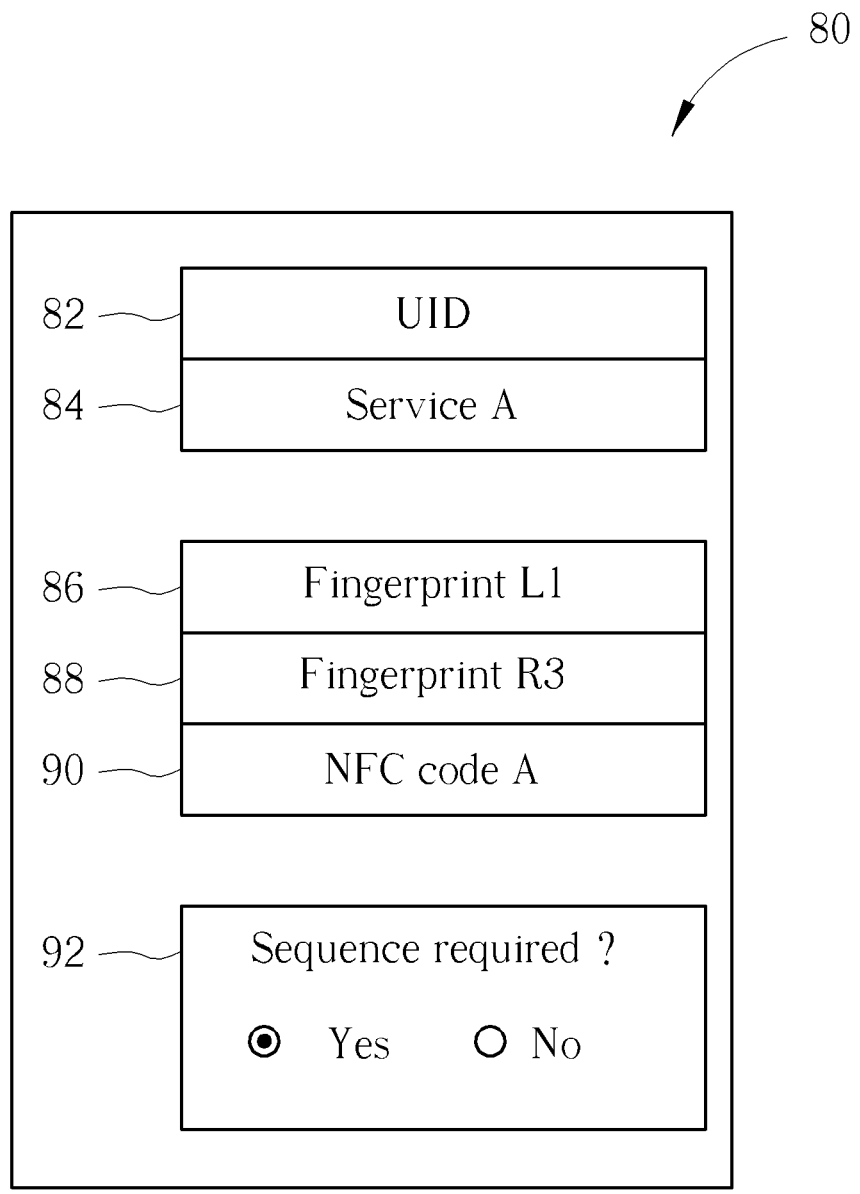
FIG. 4 is an example of a service profile that a user has created for a given service provider that the user would like to access.

Please refer to FIG. 4. FIG. 4 is an example of a service profile 80 that a user has created for a given service provider that the user would like to access. First of all, the service profile 80 stores a field for a UID 82 to indicate the user that is being granted access, and another field for a given service provider called "Service A" 84. A different service profile could be set up for each different combination of users and service providers, and the service profile governs how the indicated user is granted access to the indicated service provider.

In the example of service profile 80, three different identification fields are present, and these fields respectively contain a fingerprint of the first finger on the left hand 86, a fingerprint of the third finger on the right hand 88, and an NFC code referred to as "NFC code A" 90 that the user has registered in the database 14. A sequence field 92 asks the user if the identification data corresponding to the three different identification fields needs to be input in the indicated sequence or not. In this example, sequence field 92 indicates that the indicated sequence is indeed required. This means that the user needs to input the fingerprint of the first finger on the left hand 86, the fingerprint of the third finger on the right hand 88, and the NFC code A 90 in this exact sequence in order for the user indicated by UID 82 to be granted access to the indicated service "Service A" 84. If any of the required identification data is not input or is input in the wrong sequence, or if any extra identification data is provided, then the user will not be granted access. In the example shown in FIG. 4, the user has a high degree of control for customizing how many identification fields are used, which particular identification fields are used, and whether or not a given sequence is required in order to access each different service provider that the user has registered in the database 14.

Figure 5:
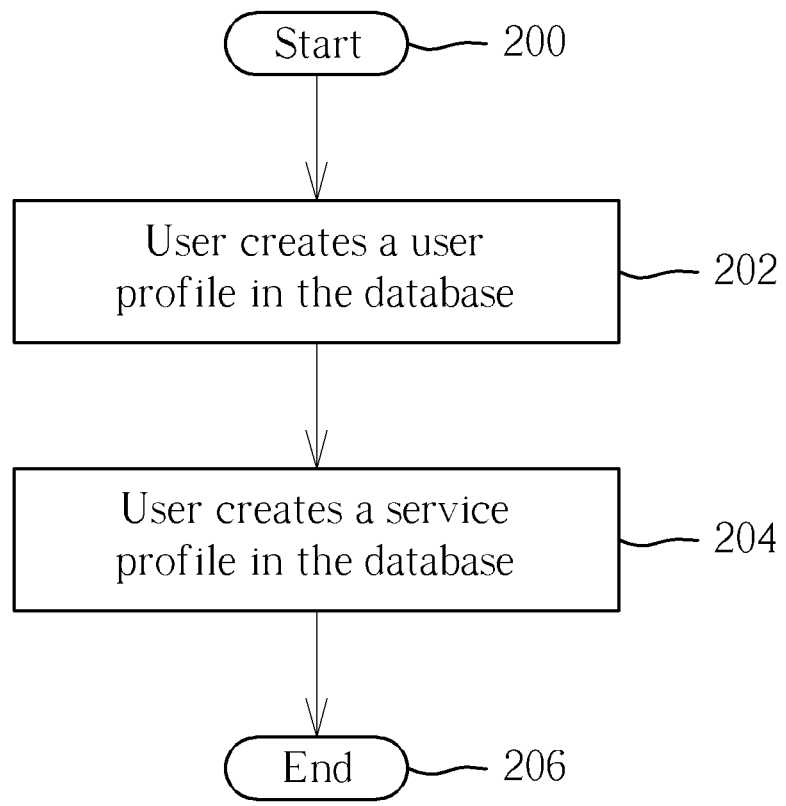
FIG. 5 is a flowchart describing the method for a user to register a user profile in the database according to the present invention.

Please refer to FIG. 5. FIG. 5 is a flowchart describing the method for a user to register a user profile in the database 14 according to the present invention. Steps in the flowchart will be explained as follows.

Step 200: Start.

Step 202: The user creates a user profile to be stored and registered in the database 14. Referring to the example of the user profile 50 shown in FIG. 3, the user profile 50 contains the UID 52 and a plurality of identification fields 54-68 that correspond to the UID 52.

Step 204: The user creates a service profile to be stored and registered in the database 14. Referring to the example of the service profile 80 shown in FIG. 4, the service profile 80 contains the UID 82, the indicated service "Service A" 84, the three different identification fields 86, 88, and 90, and the sequence field 92.

Step 206: End.

Figure 6:
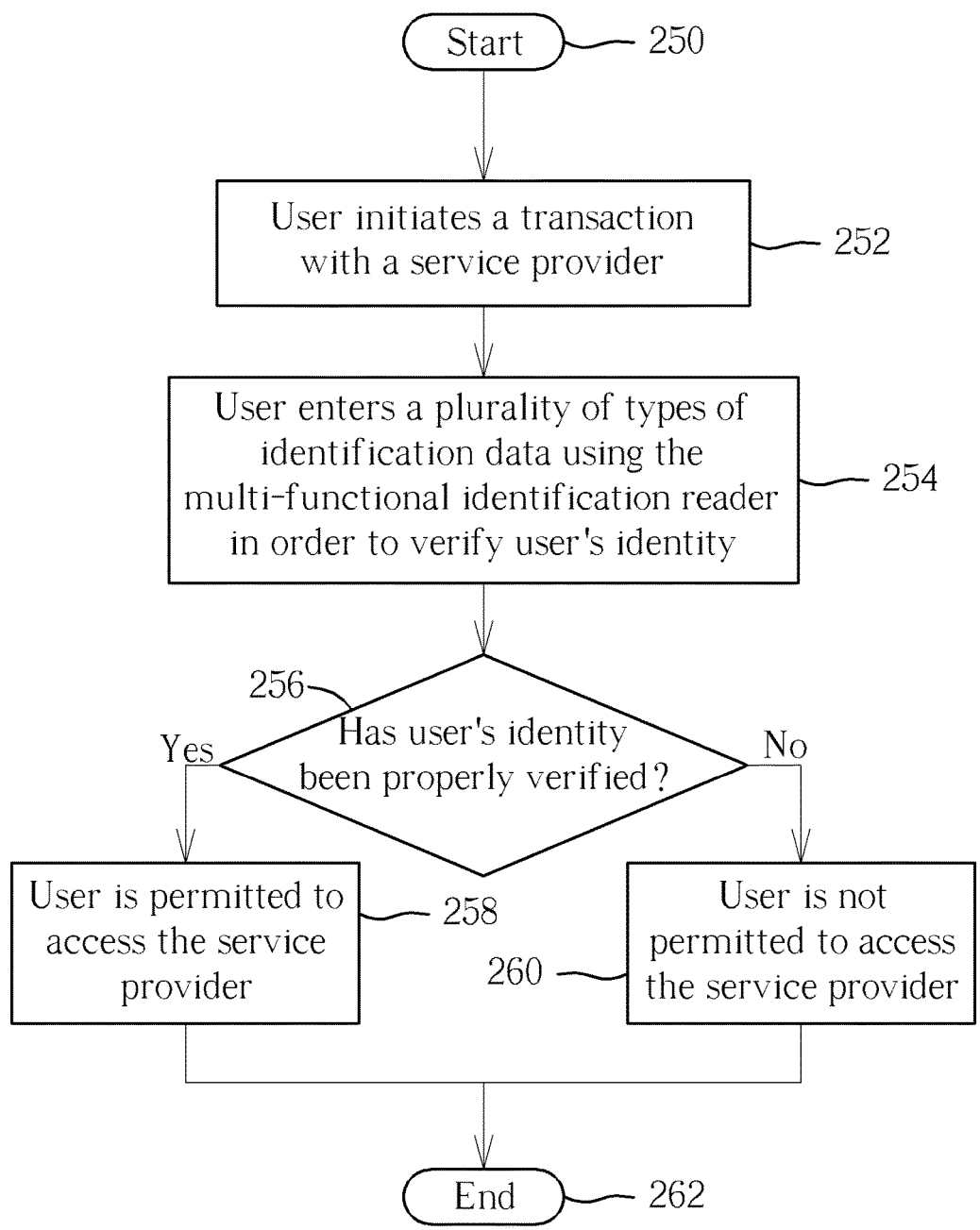
FIG. 6 is a flowchart describing how a user is granted or denied access to the service provider by entering identification data according to the present invention.

Please refer to FIG. 6. FIG. 6 is a flowchart describing how a user is granted or denied access to the service provider

18 by entering identification data according to the present invention. Steps in the flowchart will be explained as follows.

Step 250: Start.

Step 252: The user initiates a transaction with the service provider 18. The user may initiate the transaction in a variety of ways, such as by pressing a button, opening a software application, or by starting to enter identification data via the multi-functional identification reader 20.

Step 254: The user enters a plurality of types of identification data using the multi-functional identification reader 20 in order to verify the user's identity.

Step 256: Determine if the user's identity has been properly verified. If so, go to step 258. If not, go to step 260.

Step 258: The user is permitted to access the service provider 18 since the user's identity has been verified. Go to step 262.

Step 260: The user is not permitted to access the service provider 18 since the user's identity has not been verified.

Step 262: End.

Since the server 12, the multi-functional identification reader 20, and the service provider 18 are all in communication with one another over the internet 16, the multi-functional identification reader 20 can be placed anywhere that is convenient for a user to access it. Many multi-functional identification readers 20 can be placed all over the world, and the user simply needs to use one of them in order to verify the user's identity. For example, a multi-functional identification reader 20 can be placed near or on an ATM for permitting the user to access the ATM, can be placed near an access control door for permitting the user to enter through the access control door, or can be placed in a user's home so that the user can access services online. Since the user's identity can be verified with a high degree of confidence using the multi-functional identification recognition system 10, the multi-functional identification recognition system 10 can even replace the function of a notary public or other systems that are currently used for verifying identities.

Since the multi-functional identification reader of the present invention multi-functional identification recognition system can recognize a user's identity using a plurality of different types of identification data, the present invention provides strong protection to whatever service provider makes use of the multi-functional identification reader.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-functional identification recognition system, comprising:
    a server storing a database, the database containing a plurality of user identities, wherein for each user identity, the database stores a corresponding plurality of identification fields for uniquely identifying a user corresponding to the user identity; and
    a multi-functional identification reader being in communication with the server through an internet connection and having a plurality of identity recognizing devices, wherein when the user registers with the server or verifies identification data already stored in the server, a plurality of identity recognizing devices read the user's identification data and send the identification data to the server through the internet connection, and each type of identification data is stored in or checked against one of the identification fields corresponding to the user;
    wherein each user provides a quantity of the identification fields to be used, selects a sequence of how different types of identification data should be entered, and associates this sequence and the quantity of the identification fields with a given service.

2. The multi-functional identification recognition system of claim 1, wherein each user selects which types of identification data the user registers with the server.

3. The multi-functional identification recognition system of claim 1, wherein each user selects which types of identification data the user associates with a given service.

4. The multi-functional identification recognition system of claim 1, wherein the user's identity must be verified with the plurality of identity recognizing devices before the user is permitted to access a given service.

5. The multi-functional identification recognition system of claim 1, wherein the multi-functional identification reader has identity recognizing devices selected from a group consisting of an iris scanner, a fingerprint scanner, a finger vein scanner, a palm vein scanner, a near field communication (NFC) scanner, a one-dimensional barcode scanner, a two-dimensional barcode scanner, or a keypad for allowing the user to enter a personal identification number or a password.

6. A method of authenticating a user's identity using a multi-functional identification recognition system, the method comprising:
    the user registering with a database stored in a server, the database containing a plurality of user identities, wherein for each user identity, the database stores a corresponding plurality of identification fields for uniquely identifying a user corresponding to the user identity;
    registering identification data for each user using a multi-functional identification reader being in communication with the server through an internet connection and having a plurality of identity recognizing devices, wherein when the user registers with the server, a plurality of identity recognizing devices read the user's identification data and send the identification data to the server through the internet connection, and each type of identification data is stored in one of the identification fields corresponding to the user;
    each user providing a quantity of the identification fields to be used, selecting a sequence of how different types of identification data should be entered, and associating this sequence and the quantity of the identification fields with a given service; and
    verifying the user's identity by reading the user's identification data with the multi-functional identification reader, sending the read identification to the server, and comparing the read identification data with the identification data stored in the database.

7. The method of claim 6, further comprising each user selecting which types of identification data the user registers with the server.

8. The method of claim 6, further comprising each user selecting which types of identification data the user associates with a given service.

9. The method of claim 6, further comprising verifying the user's identity with the plurality of identity recognizing devices before the user is permitted to access a given service.

10. The method of claim 6, wherein the multi-functional identification reader has identity recognizing devices selected from a group consisting of an iris scanner, a fingerprint scanner, a finger vein scanner, a palm vein scanner, a near field communication (NFC) scanner, a one-dimensional barcode scanner, a two-dimensional barcode scanner, or a keypad for allowing the user to enter a personal identification number or a password.

\* \* \* \* \*